United States Patent [19]

Sweazey

[11] Patent Number: 5,165,019
[45] Date of Patent: Nov. 17, 1992

[54] RING INTERCONNECT SYSTEM ARCHITECTURE

[75] Inventor: Paul Sweazey, San Jose, Calif.

[73] Assignee: Apple Computer, Inc., Cupertino, Calif.

[21] Appl. No.: 530,111

[22] Filed: May 29, 1990

[51] Int. Cl.$^5$ .............................................. G06F 13/38
[52] U.S. Cl. ............................ 395/200; 364/DIG. 1; 364/229.3; 364/241.8; 364/242.94; 364/284.3; 364/284.4
[58] Field of Search ............... 395/200; 370/60, 85.4, 370/85.5, 85.12; 364/200 MS File, 900 MS File

[56] References Cited

U.S. PATENT DOCUMENTS

| | | | |
|---|---|---|---|
| 3,749,845 | 7/1973 | Fraser | 179/15 |
| 4,430,700 | 2/1984 | Chadima, Jr. et al. | 364/200 |
| 4,468,734 | 8/1984 | Lanier et al. | 364/200 |
| 4,646,232 | 2/1987 | Chang et al. | 364/200 |
| 4,710,917 | 12/1987 | Tompkins et al. | 370/62 |
| 4,768,145 | 8/1988 | Wheelwright et al. | 364/200 |
| 4,780,870 | 10/1988 | McHarg et al. | 370/60 |
| 4,783,730 | 11/1988 | Fischer | 364/200 |
| 4,814,978 | 3/1989 | Dennis | 364/200 |
| 4,815,071 | 3/1989 | Shimzu | 370/60 |
| 4,835,674 | 5/1989 | Collins et al. | 364/200 |
| 4,837,676 | 6/1989 | Rosman | 364/200 |
| 4,918,644 | 4/1990 | Terada et al. | 364/900 |
| 4,979,098 | 12/1990 | Baum et al. | 364/200 |

FOREIGN PATENT DOCUMENTS

WO8403192  8/1984  PCT Int'l App.
2068154A   8/1981  United Kingdom.
2226740A   7/1990  United Kingdom.

Primary Examiner—Thomas M. Heckler
Attorney, Agent, or Firm—Blakely, Sokoloff, Taylor & Zafman

[57] ABSTRACT

In an improved computer system ring interconnection including a plurality of nodes such nodes being connected by transmission apparatus to a source node of information and a recipient node of information and being associated with at least one of a plurality of computer system components; in which each of such nodes includes information receive and transmit apparatus to and from the associated system component(s) including voucher signal placing apparatus indicating internodal information for transfer, voucher signal receive apparatus determining ability to receive, ticket signal placing apparatus indicating ability to receive information associated with voucher; apparatus to relay information to other nodes; internodal relay apparatus for tickets and vouchers; and information selection apparatus depending on urgency status including apparatus for storing information originated from component and information from other nodes to other nodes based on urgency level, and apparatus for selecting of this information to be transferred on the basis of highest urgency level; the improvement including apparatus for delaying the transfer of voucher signals for information of a particular urgency level through a node when the associated system component is ready to transmit information of a higher urgency level.

16 Claims, 3 Drawing Sheets

RING INTERCONNECT SYSTEM ARCHITECTURE

BACKGROUND OF THE INVENTION

1. Field of the Invention

This invention relates to interconnection circuitry and, more particularly, to improved apparatus for handling data within a computer system in a manner that a plurality of data sources can transfer information to a plurality of destinations concurrently.

2. History of the Prior Art

The typical computer system utilizes a busing arrangement as its primary interconnection to transfer information from one component of the system to another. Such a system usually includes an address and a data bus, each comprising a number of conductors which physically connect to each of the system components such as a central processor and main memory. During the time that any particular source of information is utilizing the buses, the buses are unavailable for use by any other source since the conductors of each bus available to carry either address or data information are occupied. In the past, busing arrangements have sufficed for transferring information in the typical personal computer or work station. However, the requirements for pathways to handle more and more information faster have increased to the point that various functions cannot be performed by the typical busing arrangement.

In order to overcome the limitations of a busing arrangement, various ring interconnection arrangements have been suggested in which each system component is directly connected by one-way connection paths to receive information from one single other system component and to send information to another single system component. Each component forwards information around the ring until the information arrives at its destination. Separating the interconnection into individual paths between components isolates the components from all but two other components but increases the amount of traffic over that which can be handled by a system bus because a number of sources of information can communicate with a number of destinations at the same time.

Most ring-type systems suggested to date have been retry systems where one system component places a packet of information on the ring addressed to another component. If the addressed component cannot handle the incoming information, it places a retry command on the ring causing the operation to be terminated, the transmitted information to be dumped, and the packet to be re-sent after some delay. The retry operation inherently slows the system when the amount of traffic on the system approaches saturation.

Figure 3:
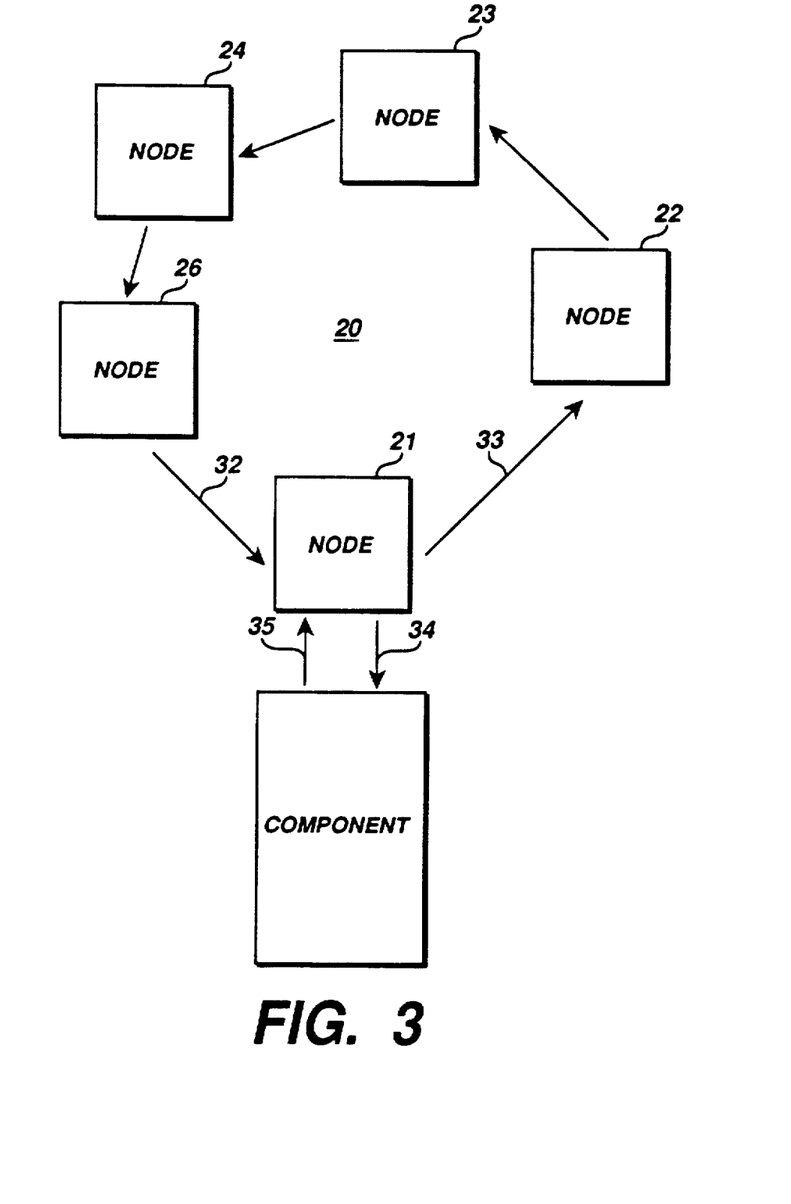
FIG. 3 illustrates the overall connection arrangement of the basic ring type interconnection.

In order to overcome the problems of retry ring systems and provide a system capable of transferring much more data than conventional computer arrangements, a new interconnect has been devised which is the subject of U.S. patent applications Ser. No. 07/508,833, entitled RING INTERCONNECT SYSTEM ARCHITECTURE, P. Sweazey, filed Apr. 12, 1990, and assigned to the assignee of this invention; and Ser. No. 530,096, entitled IMPROVED RING INTERCONNECT SYSTEM ARCHITECTURE, P. Sweazey, filed on May 29, 1990, and assigned to the assignee of this invention. Refer to FIG. 3. This new interconnect in its basic form is made up of a plurality of nodes each such node being associated with at least one of a plurality of computer system components. The nodes are connected in a unidirectional ring in which transmission paths connect each of the nodes to one node which is a source of information and to another node which is a recipient of information.

Each of such nodes includes apparatus for receiving information from and transferring information to the associated one of the system components. When the associated system component desires to transfer information to another system component, it causes the associated node to generate and place a voucher signal on the transmission path to indicate that the node has information to be transmitted to another system component. Each node includes storage space for information and apparatus which responds to the receipt of a voucher signal directed to it as a target node for determining whether the node is able to store information in its storage space. Each node also includes apparatus which responds to a determination that storage space is available by placing a ticket signal to so indicate on the transmission path directed to the node which is to be the source of the information. When a source node receives such a ticket signal, it causes the information packet to be launched on the transmission path. In this manner, no information is propagated on the transmission path until space is available for it at the target node and delays due to information rejection at the target node are eliminated.

Each node also includes circuitry to relay voucher and ticket signals and information which are directed to another node so that information is passed along the transmission path. Moreover, each node includes apparatus for assuring that both voucher and ticket signals are transferred by the node in preference to any information. By this means the transferred information on the transmission path does not get in the way of and delay the signals which control the transmission of that information.

In the improved arrangement, the system is able to select among the different information to be transferred by the various nodes and transmit first that information which is most urgent. In this manner, the system is able to resolve conflicts between different types of information and handle information such as sound and video prior to information which does not have the same real time requirements.

However, situations have been found in which a node of the improved system is incapable of transmitting higher priority information than that being transferred through that node because buffers which hold information being transferred through the node would overflow were the transmission of the lower level information to be interrupted to allow for transmission of the higher level information by the node.

SUMMARY OF THE INVENTION

It is, therefore, an object of the present invention to increase the load handling abilities of a computer system.

It is another, more specific object, of the present invention to provide an improved secondary interconnection arrangement for a computer system.

It is an additional object of the present invention to provide a secondary interconnection arrangement for a computer system capable of handling concurrently information from a plurality of sources directed to a plurality of destinations and to select among information available for handling in a manner that the most urgent information is handled first.

It is yet another object of the present invention to overcome the tendency of a secondary interconnection arrangement for a computer system to transmit lower urgency level information under certain circumstances.

These and other objects of the present invention are realized in an improved computer system ring interconnection comprising a plurality of nodes each such node being connected by transmission means to a node which is a source of information and to a node which is a recipient of information and being associated with at least one of a plurality of computer system components; in which each of such nodes comprises means for receiving information from and transferring information to the associated one of the system components including means for placing a voucher signal on the transmission means to indicate that the associated system component has information to be transmitted to another system component, means responsive to the receipt of a voucher signal for determining whether the associated one of the system components is able to receive information, and means responsive to the determination that the associated component is able to receive information for placing a ticket signal to so indicate on the transmission means; means for relaying information to be transferred through the node directed to other such nodes; means for relaying voucher signals and tickets signals through a node; and means for selecting information to be transferred based on the urgency of the information including means for storing information originated by the associated system component based on the urgency of the information. means for storing information to be transferred through the node directed to other such nodes based on the urgency of the information, and means for selecting information to be transferred from the information to be transferred through the node and the information received from the associated system component on the basis of the highest urgency level; the improvement comprising means for delaying the transfer of voucher signals for information of a particular urgency level through a node when the associated system component is ready to transmit information of a higher urgency level.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

To overcome the problems of the retry ring systems, the improved system of the above-mentioned patent application has been devised. The system breaks information to be sent into packets each of a preselected size. A reservation voucher is generated for each packet of information which is to be sent. The voucher is placed on the ring interconnect by the source component addressed to the destination component while the packet of information remains at the source component. The voucher is forwarded by the various components which are unaddressed nodes on the ring interconnect until it reaches the addressed component.

If the destination component can accept the packet of data, space for the packet is reserved at the destination component; and a ticket signal is placed on the ring interconnect addressed to the source component. If the destination component cannot accept the packet of information, the voucher is stored in a queue at the destination until the destination component is able to handle the packet. When the destination component is able to handle the packet, a ticket signal is placed on the ring interconnect addressed to the source component. When the ticket signal is received by the source component, the packet is released onto the ring interconnect. The packet is forwarded by the various components which are unaddressed nodes on the ring interconnect until it reaches the addressed component. When the packet of information arrives at the destination component, the reserved space is available and the information is stored in that space for utilization.

Using this system, information is never placed on the ring interconnect until space is available at the destination. Consequently, a retry is not necessary and information does not fill the interconnect to interfere with other information only to be dumped when a destination component is busy. This substantially reduces the loss of system bandwidth caused by the retry method and allows the system to function much more efficiently than retry systems when approaching saturation.

Typically, the ring interconnected arrangement is a secondary interconnection and the individual components of the computer system are components which are joined in a primary busing arrangement such as the NuBus manufactured and used by Apple Computer, Inc., in its line of Apple Macintosh II personal computers. In such an arrangement, each of the components is also connected to the ring interconnect arrangement through an individual node which joins to the ring interconnect.

In order to make the operation more efficient, apparatus is provided so that the flow of voucher and ticket signals is not impeded by the flow of the information packets. This is accomplished by apparatus in each node which assures that voucher and ticket symbols are transmitted in favor of information packets. In this manner, the large delays which might otherwise be experienced from the time a voucher is transmitted until the receipt of a ticket while either the voucher or the ticket wait for information packets to clear the transmission lines is eliminated.

Moreover, the improved ring interconnect system is made even more efficient by dividing information into different urgency levels and assuring that the most urgent information is sent by each node before less urgent information. Such an arrangement allows information, such as video and sound information, which requires immediate handling to be transferred at a higher urgency level than information which may be delayed without affecting its usefulness.

The system of the improved invention is subject to a problem which may arise even though it is functioning correctly. Briefly, the system uses a number of first-in first-out (FIFO) buffers in each node to store information which is being transferred through the node. Each of these buffers is arranged to hold information of particular urgency levels. Information originating at the node is also stored in buffers which hold information based on its urgency level. These sets of buffers which divide information based on urgency level allow the selection for transmission of the information at the highest urgency level stored in any of the buffers. Theoretically, this will cause the information of highest urgency level always to be transmitted before information of a lower level.

However, since the buffers cannot be of infinite length, it is possible for information of a lower urgency level already being transmitted to be interrupted and buffered while higher level information is being transmitted. Moreover, nodes with space available may continue to authorize the transfer of lower urgency level information through a node already buffering the lower level information. Consequently, it is necessary to provide means for emptying lower level buffers in which information tends to back up before those buffers overflow and the information being transmitted is lost. To accomplish this, the system includes override circuitry which tests how full a buffer has become and assures the transmission of its information before overflow can occur. This has the effect of stopping the release of information packets originating at the node even though that information is of a higher urgency level than the information being transmitted. If a substantial amount of low urgency information is being transferred and more continues to be authorized, then a condition exists in which the flow of high urgency information is impeded from a source node.

Figure 1:
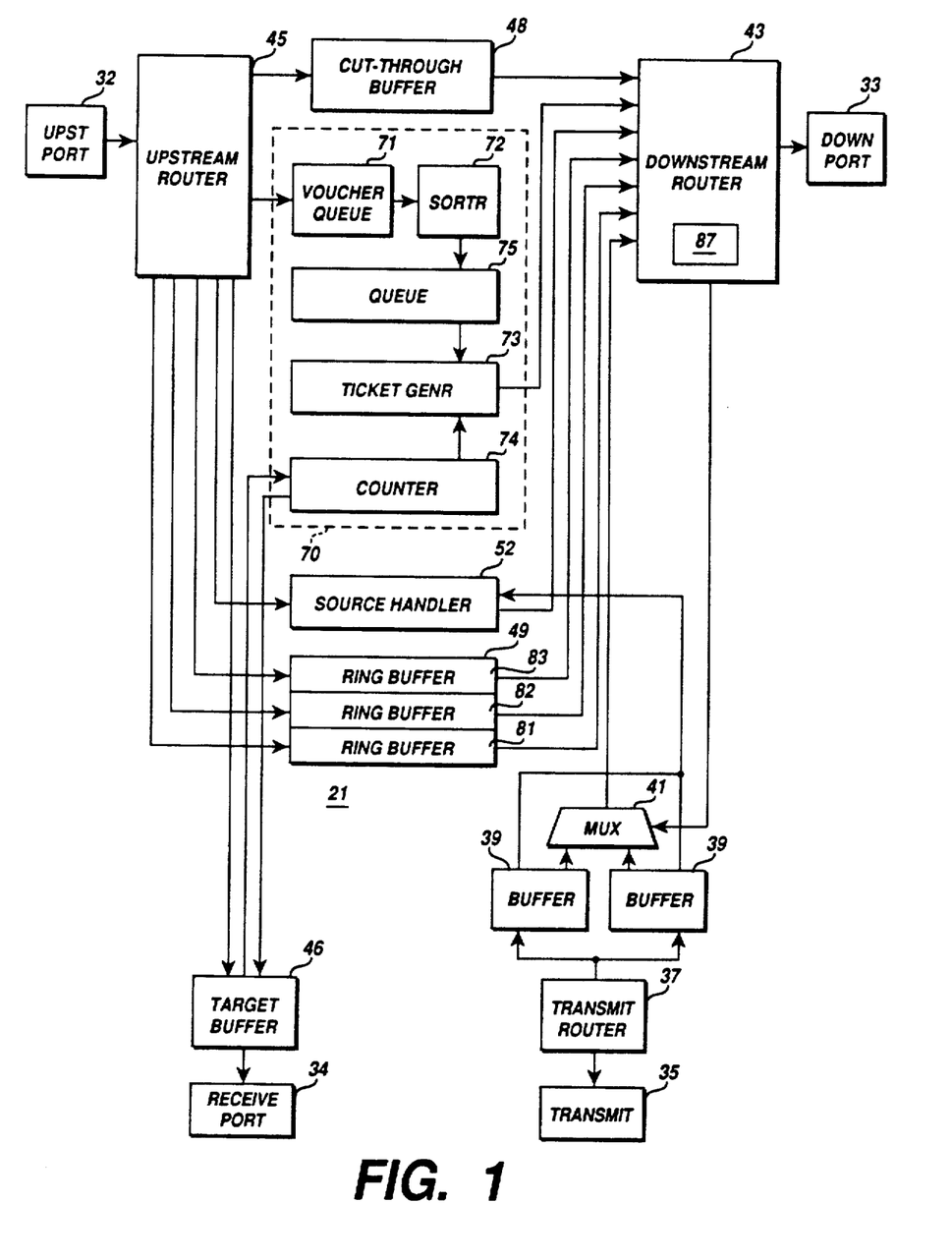
FIG. 1 is a block diagram of an interconnect for a computer system constructed in accordance with the present invention.

It is the purpose of the present invention to relieve the possibility of low urgency buffer overflow without impeding the transfer of high urgency level information. The circuit of FIG. 1 is arranged in accordance with this invention to accomplish this purpose. The circuit of FIG. 1 is similar to the systems disclosed in the co-pending patent applications except that various elements thereof have been modified in order to provide the improvements of this invention. In FIG. 1, a node 21 of a ring interconnect arrangement is illustrated. The ring interconnect arrangement has a number of individual nodes each of which may be associated with or a part of one of the components (e.g., central processing unit, random access memory) of a computer system. Each of the components includes node circuitry which includes all of the circuitry for accomplishing the generation of vouchers and tickets and for placing packets of data on the ring interconnect. Since all of the nodes of the ring interconnect are similar, only the node 21 is illustrated.

The node 21 includes an upstream port 32 connected to receive information and a downstream port 33 connected to transmit information in the ring interconnect arrangement. The node 21 also includes a receive port 34 through which information is transferred to the associated component of the computer system and a transmit port 35 through which information is transferred from the associated component of the computer system.

In this description, the following definitions are used. A symbol is any quantity of data that can be transferred on a parallel data path during one phase of a clock cycle. A stream is a logically-contiguous sequence of data symbols of arbitrary length. A packet is a portion of a stream having a fixed limit consisting of one head symbol, data or information symbols, and one tail symbol. The first symbol in a packet of information is thus a head symbol and the last is a tail symbol. Each symbol used with the ring interconnect includes bits which identify its source node, its target node, the stream with which it is associated, its level of urgency, and an indication of the type of signal (voucher, ticket, head, data, or tail). Thus, a voucher symbol indicates its source, its target, its stream, its urgency level, and that it is a voucher. In this discussion, when information is referred to, it is the data or information symbols that are concerned rather than the access symbols such as the voucher and ticket symbols.

Typically, a stream of information enters the node 21 through the transmit port 35 from the computer component associated with the node and is transferred to the ring interconnect through the downstream port 33. Information directed on the ring interconnect to a node arrives at the upstream port 32 of a target node and is transferred to the associated component via the receive port 34.

The transmit port 35 of the node 21 is connected to a transmit router 37. The transmit router 37 is responsible for controlling the flow of streams through the transmit port 35 and for sending those streams of information to one of a plurality of source buffers 39. The transmit router 37 receives the symbol stream from the transmit port 35, determines which of the source buffers 39 is entitled to receive the stream, and forwards the stream to the selected source buffer 39. The transmit router 37 sorts the incoming symbols by stream number and collects those symbols together so that all symbols pertaining to one stream are placed in one source buffer 39. Allowing multiple stream numbers allows a node to transmit multiple streams of information.

Each source buffer 39 functions to hold one of a number of streams and to hold that stream until it can be sent through the downstream port 33. It is possible to utilize a series of source buffers which are substituted for the source buffers 39 illustrated in FIG. 1 to hold information packets of different urgency levels as is explained in the above-mentioned patent application directed to the improved ring arrangement. However, it is not necessary to the description of the present invention that a node be capable of originating multiple urgency levels of information so that level of complication is omitted from the present description. In the description which follows, it will be assumed that five different urgency levels designated one through five exist for the entire system with the one level being the lowest urgency level and the five level being the highest urgency level. For the purpose of this description, the information urgency level at which the component at the particular node 21 is capable of sending is assumed to be urgency level three.

As soon as a source buffer 39 has a head symbol and one data symbol, it sends signals indicating the target node, the urgency level, and the stream number to a source handler 52. The source handler 52 responds by forming a voucher symbol using this information and sending the voucher symbol to the downstream router 43. It should be noted that in the arrangement of this invention, the voucher symbols from a source node carry urgency levels so that a distinction can be made as to which information should be transmitted first.

The voucher is placed on the ring interconnect 20 to cause storage space to be reserved in the target buffer 46 of a target node. The source handler 52 then awaits the return of a ticket symbol for the stream. During this period, it may send additional vouchers for other source buffers 39 so that a number of vouchers may be outstanding from a single source node.

A packet multiplexor 41 determines which source buffer 39 should be emptied and forwards the chosen stream of information to a downstream router 43. The packet multiplexor 41 selects among the source buffers 39 that have permission to transmit a packet and selects one. Once selected, the packet multiplexor 41 transmits the packet of information until the transmission is terminated by the source buffer 39 or by the downstream router 43. The downstream router 43 chooses between many possible sources of information by selecting them according to a defined priority which will be explained later. The downstream router 43 controls the transfer of information onto the ring interconnect through the downstream port 33.

An upstream router 45 is arranged to receive and interpret the symbol stream arriving at the upstream port 32. The upstream router 45 uses the coding describing the type of symbol (voucher, ticket, head, data, tail), the target address for the symbol, and the stream number to distinguish between the incoming symbols and to direct the incoming symbols to their proper places. A cut-through buffer 48, a target handler 70, and the source handler 52 receive access symbols (vouchers and tickets) while a ring buffer 49 and the target buffer 46 receive the packet symbols (heads, data, and tails). The cut-through buffer 48 and the ring buffer 49 handle symbols which are forwarded through the node while the target handler 70, the source handler 52, and the target buffer 46 handle symbols intended for the node 21.

The upstream router 45 decodes the information and determines if it is addressed to that node 21. The target buffer 46 is connected to receive packets of information from the upstream router 45 which are directed to that particular node 21. If the symbol is a head symbol addressed to this node 21, it is directed to the target buffer 46. If the symbol (i.e., the following packet of information and tail symbol) is associated with a matching head symbol, it is directed to the target buffer 46. In the previously described arrangements, the cut-through buffer 48 is a temporary repository of access symbols not addressed to the particular node 21. The ring buffer 49 includes a plurality of large capacity first-in first-out circuits. These circuits receive and store information destined for another node at a number of different urgency levels.

In order to provide for allotting space at a target node 21 based on the urgency of the information to be sent, the target handler 70 receives the voucher access symbols directed to that node 21. The target handler 70 monitors the state of the target buffer 46 and, assuming space is available, reserves space and issues tickets to guarantee that the target buffer 46 will receive the information. These ticket symbols also include information indicating the urgency level of the information to be transmitted.

However, if the number of vouchers requesting space in target buffer 46 exceeds the space available, the additional vouchers are stored in an unsorted target voucher queue 71 in the target handler 70. The target handler 70 organizes the vouchers in order of the urgency of the signals. This is accomplished by routing each incoming voucher symbol from the queue 71 through a sorter circuit 72 and sending the results to a sorted voucher queue 75. The target handler 70 determines whether space is available by including a counter 74 that is initialized to the maximum number of packets that can be stored in the target buffer 46 at once. Each time the target handler 70 issues a ticket, the counter is decremented. Each time the target buffer 46 sends a tail-received signal to the target handler 70, the counter is incremented. If the counter goes to zero, there is no more space in the buffer 46, the voucher is placed in the sorted voucher queue 75, and no ticket is issued. If the voucher queue 75 is not empty, each time a tail-received signal arrives, a voucher is removed from the queue 75 and a ticket is generated by the ticket generator 73. If a voucher arrives when the queue 75 is empty and the counter value is greater than zero, then a ticket is derived from the voucher and sent immediately to the downstream router 43.

The target handler 70 organizes the voucher queue 75 in order of the urgency of the signals. As pointed out, this is accomplished by routing each incoming voucher symbol and the symbols in the voucher queue 71 through the sorter circuit 72 before sending any voucher to the sorted voucher queue 75. In this manner, when the space in the target buffer 46 is full, the additional space allotted as the buffer 46 empties is allotted first to the most urgent information, the voucher for which then stands at the head of the voucher queue 75.

The source handler 52 receives the ticket symbols which indicate that a target node is ready to receive information from the node 21. As pointed out above, it is the source handler 52 which generates the voucher access symbols sent by the downstream router 43 to reserve space at a target node for a stream of information held in a source buffer 39. Thus, when the source handler 52 receives a ticket symbol indicating that space has been reserved in a target node, the source handler 52 releases the appropriate packet of data from the source buffer 39 by sending a launch signal to the appropriate source buffer 39 giving it permission to send the packet of data collected. The source buffer 39 sends a start signal to the packet multiplexor 41 which eventually responds by enabling the output of the source buffer 39.

In order to provide for the transmission of information through the nodes of the interconnect on an urgency basis, the ring buffer 49 includes three individual ring buffers 81-83 each of which handles different urgency levels of information. For the purpose of explanation, the ring buffer 81 will be considered to handle information of levels one and two urgency (the levels below that originated at this node 21), the ring buffer 82 to handle information of level three urgency (the same level as signals originated at this node 21), and the ring buffer 83 to handle information of levels four and five urgency (the levels above the level originated at this node 21).

The ring buffers 81-83 are each the temporary repository of packet symbols at particular urgency levels that are to be forwarded to other nodes. Each individual buffer may be organized as a first-in first-out circuit whose capacity is sufficient to absorb whatever upstream traffic may be expected to arrive at the included urgency levels while the downstream router 43 is selecting and transmitting symbols from other sources. The number of individual ring buffers needed in the ring buffer 49 depends on the number of urgency levels which are to be originated at the particular node 21. For each urgency level to be originated at that node, there must be a ring buffer to handle traffic of an equal urgency level, one to handle traffic of higher urgency levels, and one to handle traffic of lower urgency levels.

Information is directed by the upstream router 45 to the ring buffers 81-83 based on the particular urgency level associated with the symbols when the symbols involved show the information is addressed to other than this node 21.

The downstream router 43 selects between the numerous sources of symbols and routes their symbol streams to the downstream port 33. In the previous interconnects, the highest priority symbols were those from the cut-through buffer 48 and nothing could inhibit the transfer of these symbols from propagation through the downstream port 33. The cut-through buffer 48 stored forwarded access symbols (vouchers and tickets), accounting for phase differences between the upstream router 45 and the downstream router 43. Access symbols not addressed to this node 21 simply passed through the cut-through buffer 48 thereby assuring maximum propagation speed for such symbols around the ring interconnect. The next highest priority source of symbols is the target handler 70 whose primary function is to return the ticket access symbols generated by this node 21 in response to received voucher access symbols. The next highest priority source of symbols is the source handler 52 which sends the voucher access symbols generated at this node 21 to the downstream router 43. All of these access symbols propagated through the node 21 and around the ring interconnect with greater priority than any of the packet symbols in the prior interconnects.

If there are no access symbols awaiting transmission, then packet symbols may be forwarded from the ring buffers 81-83 or from the packet multiplexor 41. In order to assure that the information is routed through and from the node 21 on the appropriate urgency basis, the downstream router 43 proceeds through each of the urgency levels of the ring buffers 81-83 and the packet multiplexor 41 in turn from the highest to the lowest. If none of the ring buffers 81-83 or the packet multiplexor 41 are in the process of transmitting a packet, then the head symbol of the information in the highest level ring buffer 81-83 or source buffer 39 is selected for transmission to the downstream port 33. If a packet is being sent by one or the other of the packet sources, no information can be sent by a lower or equivalent urgency level source until that packet has been sent. If two equivalent urgency level packets appear at the same time (as at the ring buffer 82 and the packet multiplexor 41), then one or the other of the signals may be selected on a round robin or other basis to ensure fairness.

If information in any of the ring buffers 81-83 or the source buffers 39 is being transmitted and information is received in one of the ring buffers 81-83 or the source buffer 39 which is at a higher urgency level, a level detector circuit 87 in the downstream router 43 detects this fact, terminates the transmission of the symbols being sent at that point, and begins transmitting the higher level information. This has the effect of nesting a higher urgency level information packet within a lower level packet. This higher level signal may in turn be interrupted by another even higher level information signal during its transmission. Theoretically, with five urgency levels, four information signals might be nested in a lowest level information signal. As the highest level signal is completed as indicated by the transmission of its tail signal, the downstream router 43 scans to the next source of signals at the same urgency level (if any), then to a source at the next lower level. If a source at a particular urgency level has been previously transmitting a packet of information and that information was interrupted, this is indicated by the information first in line in the particular buffer being a data symbol rather than a head symbol, and this source is handled first at that level to complete the transmission of the packet of information. Then any other packet at that level is handled. Ultimately, all of the nested packets of information are transmitted by the downstream router 43.

However, if the amount of traffic becomes too large for any buffer 81-83 of the ring buffer 49 to handle, that buffer 81-83 sends an urgent signal to the downstream router 43 to assure that its packets of data are handled first and do not overflow. Normally, this is not a problem and merely provides a safety valve for relieving a slight back up of data.

However, it is possible that the transmission of a large number of low urgency level packets from other nodes which pass through a particular node 21 will have been authorized and the information will be in the process of transmission when interrupted by a higher level packet. As vouchers and tickets continue to be forwarded in the prior interconnects for nodes which have space for the lower level information, it is possible for that node 21 to attempt to originate a packet of information at urgency level three. Since information will be lost if the information is not forwarded from the buffer 81, the attempt to transmit information from the source node 21 will continue to be overridden in the prior art arrangements; and the higher priority information will continue to wait until the transmission of lower priority information is complete.

In order to obviate this problem, the simple cut-through buffer 48 of these prior art arrangements is modified in the present invention so that when a ring buffer handling a lower urgency level of information than is originated at the node 21 is about to overflow and generates an override signal, the cut-through buffer will test the status of the multiplexor 41. If the multiplexor 41 has packets to transmit, then the cut-through buffer 48 will not forward lower level vouchers but will instead place them in a queue. Only when the buffers 39 have been cleared will lower urgency level voucher symbols be taken from the queue and forwarded to other nodes. This has the effect of reducing the backup to the lower urgency level ring buffers (such as 81) so that they will not overflow even though information is contained therein. Consequently, the arrangement of this invention will provide the appropriate transfer of information according to priority.

Figure 2:
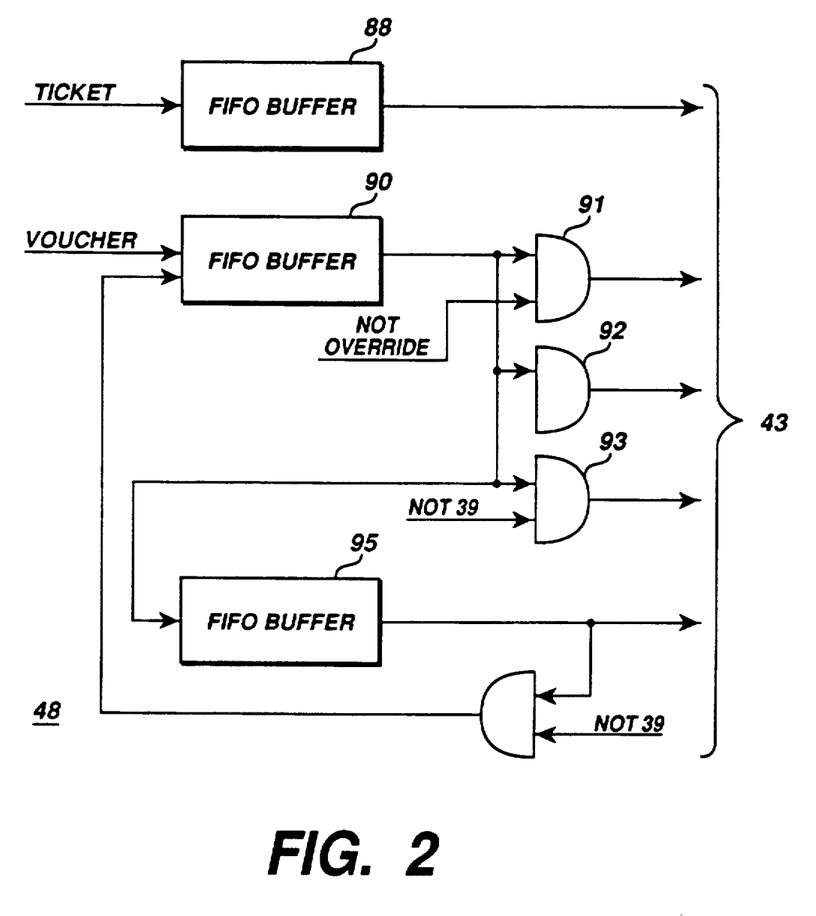
FIG. 2 is a block diagram of an improved portion of the interconnect illustrated in FIG. 1.

FIG. 2 illustrates a modified cut-through buffer 48 designed in accordance with the present invention. In FIG. 2, the buffer 48 includes a first-in first-out buffer 88 in which all ticket symbols are first placed and a first-in first-out buffer 90 in which all voucher symbols are first placed. The ticket symbols pass through the buffer 88 and are furnished to the downstream router 43. The voucher symbols pass through the buffer 90 and are furnished to an AND gate 91. If no override signal is present from the buffer 81, the voucher symbols are passed through the AND gate 91 and transferred by the downstream router 43 to the next node. If an override signal is present, the voucher symbols are transferred to a second AND gate 92 which transfers voucher symbols of urgency levels three through five to the downstream router 43. The voucher symbols of urgency levels two and one are transferred to an AND gate 93 which transfers those symbols to the downstream router 43 only when a packet is not ready for transmission at this node 21. If a packet is ready for transmission from this node as a source, the voucher symbols are transferred to another first-in first-out buffer 95 which acts as a queue to retain those symbols until the buffers 39 of this node 21 are empty of the higher urgency level information. This may be accomplished by the use of another AND gate 97 which senses the condition of the buffers 39 and returns the symbols to the first-in first-out buffer 90 only when the buffers 39 are empty.

Using this arrangement, the node 21 will transfer the lower level voucher symbols only when packets are not ready for transmission by the node. Consequently, the authorization of additional lower level information through this node will be halted even though the other nodes have space for the information. This, in turn, will gradually clear the lower level ring buffer 81 of this node 21 so that it will not overflow.

Thus it will be appreciated that the invention described herein is capable of transferring information both through each node and originated at the node based on the urgency of the information being transmitted. This ability substantially enhances the ability of the system to transmit very large amounts of information and especially the usefulness of the system in arrangements which transfer information such as video and sound information. Moreover, the invention overcomes the problem created by the override signals used to assure that the ring buffers do not overflow and assures that higher urgency information originating at a node is transferred before lower urgency information in a ring buffer about to overflow.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In an improved computer system ring interconnection comprising a plurality of nodes each of said nodes being communicatively coupled by a first transmission means to a node which is a source of information and to a node which is a recipient of information and each of said nodes being coupled by a second transmission means with at least an associated one of a plurality of computer system components; in which each of such nodes having (a) means for receiving information from and transferring information to said associated one of the computer system components over said second transmission means and for receiving information from and transferring information to others of said plurality of nodes over said first transmission means including
  (1) means for placing a voucher signal on said first transmission means to indicate that said associated computer system component has information to be transmitted to another computer system component,
  (2) means responsive to the receipt of a voucher signal received over said first transmission means for determining whether said associated computer system component is able to receive information, and
  (3) means responsive to the determination that said associated computer system component is able to receive information by placing a ticket signal to so indicate on said first transmission means;
(b) means for relaying information to be transferred through said node directed to other of said plurality of nodes, said means for relaying communicatively coupled to said first transmission means;
(c) means for relaying voucher signals and ticket signals through said node over said first transmission means; and
(d) means for selecting information to be transferred based on the urgency level of the information as indicated by said information including
  (1) means for storing information originated by said associated computer system component based on the urgency level of the information,
  (2) means for storing information to be transferred through said node directed to other of said plurality of nodes based on the urgency level of the information, said information to be transferred through said node not including ticket and voucher signals, and
  (3) means for selecting information to be transferred from the information to be transferred through said node and the information received from said associated computer system component on the basis of the highest urgency level;
wherein the improvement comprising:

means for delaying the transfer of voucher signals for information of a particular urgency level through said node when said associated computer system component is ready to transmit information of a higher urgency level.

2. In an improved computer system ring interconnection as claimed in claim 1, said means for delaying the transfer of voucher signals for information of a particular urgency level through said node when said associated computer system component is ready to transmit information of a higher urgency level comprising:

means for comparing the urgency level of information to be transferred by said associated computer system component and the urgency level of information represented by voucher signals; and means for delaying the transmission of voucher signals having a lower level of urgency.

3. In an improved computer system ring interconnection as claimed in claim 2, said means for delaying the transfer of voucher signals for information of a particular urgency level through said node when said associated computer system component is ready to transmit information of a higher urgency level further comprising means for determining when information of a lower urgency level is about to overflow said means for storing information to be transferred through said node directed to other of said plurality of nodes based on the urgency level of the information.

4. In an improved computer system ring interconnection as claimed in claim 3, said means for delaying the transfer of voucher signals for information of a particular urgency level through said node when said associated computer system component is ready to transmit information of a higher urgency level further comprising means for storing voucher signals of a lower urgency level until information of a higher urgency level has been transmitted from said associated computer system component.

5. In a computer system ring interconnection system comprising a plurality of nodes each of said nodes being communicatively coupled by a first transmission means to a node which is a source of information and to a node which is a recipient of information and each of said nodes being coupled by a second transmission means with at least an associated one of a plurality of computer system components, a node apparatus comprising:

(a) means for receiving information from and transferring information to said associated one of the computer system components over said second transmission means and for receiving information from and transferring information to others of said plurality of nodes over said first transmission means comprising:

(1) means for placing a voucher signal on said first transmission means to indicate that said associated computer system component has information to be transmitted to another computer system component;

(2) means responsive to the receipt of a voucher signal received over said first transmission means for determining whether said associated computer system component is able to receive information; and (3) means responsive to the determination that said associated computer system component is able to receive information by placing a ticket signal to so indicate on said first transmission means;

(b) means for relaying information to be transferred through said node directed to others of said plurality of nodes, said means for relaying communicatively coupled to said first transmission means;

(c) means for relaying voucher signals and ticket signals through said node over said first transmission means; and (d) means for selecting information to be transferred based on the urgency level of the information as indicated by said information comprising:

(1) means for storing information originated by said associated computer system component based on the urgency level of the information;

(2) means for storing information to be transferred through said node directed to other of said plurality of nodes based on the urgency level of the information, said information to be transferred through said node not including ticket and voucher signals; and (3) means for selecting information to be transferred from the information to be transferred through said node and the information received from said associated computer system component on the basis of the highest urgency level; and (e) means for delaying the transfer of voucher signals for information of a particular urgency level through said node when said associated computer system component is ready to transmit information of a higher urgency level.

6. In a computer system ring interconnection system as claimed in claim 5, a node apparatus wherein said means for delaying the transfer of voucher signals for information of a particular urgency level through said node when said associated computer system component is ready to transmit information of a higher urgency level comprising:

means for comparing the urgency level of information to be transferred by said associated computer system component and the urgency level of information represented by voucher signals; and means for delaying the transmission of voucher signals having a lower level of urgency.

7. In a computer system ring interconnection system as claimed in claim 6, a node apparatus wherein said means for delaying the transfer of voucher signals for information of a particular urgency level through said node when said associated computer system component is ready to transmit information of a higher urgency level further comprising means for determining when information of a lower urgency level is about to overflow said means for storing information to be transferred through said node directed to other of said plurality of nodes based on the urgency level of the information.

8. In a computer system ring interconnection system as claimed in claim 7, a node apparatus wherein said means for delaying the transfer of voucher signals for information of a particular urgency level through said node when said associated computer system component is ready to transmit information of a higher urgency level further comprising means for storing voucher signals of a lower urgency level until information of a higher urgency level has been transmitted from said associated computer system component.

9. A computer system ring interconnection system comprising:

a plurality of nodes;

first transmission means coupled to said nodes in a ring fashion;

a plurality of computer system components;

second transmission means for communicatively coupling said nodes to said plurality of computer system components;

each of said nodes being communicatively coupled by said first transmission means to a node which is a source of information and to a node which is a recipient of information;

each of said nodes being coupled by said second transmission means with at least an associated one of said plurality of computer system components, and each of said nodes further comprising:

(a) means for receiving information from and transferring information to said associated one of the computer system components over said second transmission means and for receiving information from the transferring information to others of said plurality of nodes over said first transmission means comprising:

(1) means for placing a voucher signal on said first transmission means to indicate that said associated computer system component has information to be transmitted to another computer system component;

(2) means responsive to the receipt of a voucher signal received over said first transmission means for determining whether said associated computer system component is able to receive information; and (3) means responsive to the determination that said associated computer system component is able to receive information by placing a ticket signal to so indicate on said first transmission means;

(b) means for relaying information to be transferred through said node directed to others of said plurality of nodes, said means for relaying communicatively coupled to said first transmission means;

(c) means for relaying voucher signals and ticket signals through said node over said first transmission means; and (d) means for selecting information to be transferred based on the urgency level of the information as indicated by said information comprising:

(1) means for storing information originated by said associated computer system component based on the urgency level of the information;

(2) means for storing information to be transferred through said node directed to other of said plurality of nodes based on the urgency level of the information, said information to be transferred through said node not including ticket and voucher signals; and (3) means for selecting information to be transferred from the information to be transferred through said node and the information received from said associated computer system component on the basis of the highest urgency level; and (e) means for delaying the transfer of voucher signals for information of a particular urgency level through said node when said associated computer system component is ready to transmit information of a higher urgency level.

10. A computer system ring interconnection system as described in claim 9, wherein said means for delaying the transfer of voucher signals for information of a particular urgency level through said node when said associated computer system component is ready to transmit information of a higher urgency level comprising:

means for comparing the urgency level of information to be transferred by said associated computer system component and the urgency level of information represented by voucher signals; and means for delaying the transmission of voucher signals having a lower level of urgency.

11. A computer system ring interconnection system as described in claim 10, wherein said means for delaying the transfer of voucher signals for information of a particular urgency level through said node when said associated computer system component is ready to transmit information of a higher urgency level further comprising means for determining when information of a lower urgency level is about to overflow said means for storing information to be transferred through said node directed to other of said plurality of nodes based on the urgency level of the information.

12. A computer system ring interconnection system as described in claim 11, wherein said means for delaying the transfer of voucher signals for information of a particular urgency level through said node when said associated computer system component is ready to transmit information of a higher urgency level further comprising means for storing voucher signals of a lower urgency level until information of a higher urgency level has been transmitted from said associated computer system component.

13. In a computer system ring interconnection system comprising a plurality of nodes each of said nodes being communicatively coupled by a first transmission means to a node which is a source of information and to a node which is a recipient of information and each of said nodes being coupled by a second transmission means with at least an associated one of a plurality of computer system components; a method of intercommunication for each node, said method comprising the steps of:

(a) receiving information from and transferring information to said associated one of the computer system components over said second transmission means and receiving information from and transferring information to others of said plurality of nodes over said first transmission means further comprising the steps of:

(1) placing a voucher signal on said first transmission means to indicate that said associated computer system component has information to be transmitted to another computer system component;

(2) responding to the receipt of a voucher signal received over said first transmission means by determining whether said associated computer system component is able to receive information; and (3) responding to the determination that said associated computer system component is able to receive information by placing a ticket signal to so indicate on said first transmission means;

(b) relaying information to be transferred through said node directed to others of said plurality of nodes, said means for relaying communicatively coupled to said first transmission means;

(c) relaying voucher signals and ticket signals through said node over said first transmission means; and (d) selecting information to be transferred based on the urgency level of the information as indicated by said information further comprising the steps of:
  (1) storing information originated by said associated computer system component based on the urgency level of the information;
  (2) storing information to be transferred through said node directed to other of said plurality of nodes based on the urgency level of the information, said information to be transferred through said node not including ticket and voucher signals; and
  (3) selecting information to be transferred from the information to be transferred through said node and the information received from said associated computer system component on the basis of the highest urgency level; and
(e) delaying the transfer of voucher signals for information of a particular urgency level through said node when said associated computer system component is ready to transmit information of a higher urgency level.

14. In a computer system ring interconnection system as claimed in claim 13, a method of intercommunication for each node wherein said step of delaying the transfer of voucher signals for information of a particular urgency level through said node when said associated computer system component is ready to transmit information of a higher urgency level comprises the steps of:
  comparing the urgency level of information to be transferred by said associated computer system component and the urgency level of information represented by voucher signals; and
  delaying the transmission of voucher signals having a lower level of urgency.

15. In a computer system ring interconnection system as claimed in claim 14, a method of intercommunication for each node wherein said step of delaying the transfer of voucher signals for information of a particular urgency level through said node when said associated computer system component is ready to transmit information of a higher urgency level further comprising the step of determining when information of a lower urgency level is about to overflow said means for storing information to be transferred through said node directed to other of said plurality of nodes based on the urgency level of the information.

16. In a computer system ring interconnection system as claimed in claim 15, a method of intercommunication for each node wherein said step of delaying the transfer of voucher signals for information of a particular urgency level through said node when said associated computer system component is ready to transmit information of a higher urgency level further comprising the step of storing voucher signals of a lower urgency level until information of a higher urgency level has been transmitted from said associated computer system component.

* * * * *